United States Patent Office 3,563,636
Patented Feb. 16, 1971

3,563,636
HIGH-SPEED VARIFOCAL OBJECTIVE SYSTEM
Karl Macher, Bad Kreuznach, Germany, assignor to Jos.
Schneider & Co. Optische Werke Kreuznach, Bad
Kreuznach, Rhineland, Germany
Filed Jan. 2, 1969, Ser. No. 788,427
Claims priority, application Germany, Jan. 5, 1968,
Sch 41,799
Int. Cl. G02b 15/14, 17/00
U.S. Cl. 350—184                                   2 Claims

ABSTRACT OF THE DISCLOSURE

Varifocal objective system with a relative aperture of 1:1.8 and a varifocal ratio greater than 13:1, including a basic multilens objective and a four-component front attachment with two movable negative components bracketed by two substantially fixed positive components; the first component, which may be limitedly shiftable (in whole or in part) for focusing purposes, includes a negative front lens, a positive singlet, a negative doublet and three further positive singlets; the second component consists of a negative singlet followed by a negative triplet; the third component is a meniscus-shaped singlet; and the fourth component consists of two air-spaced positive singlets.

---

Figure 1:
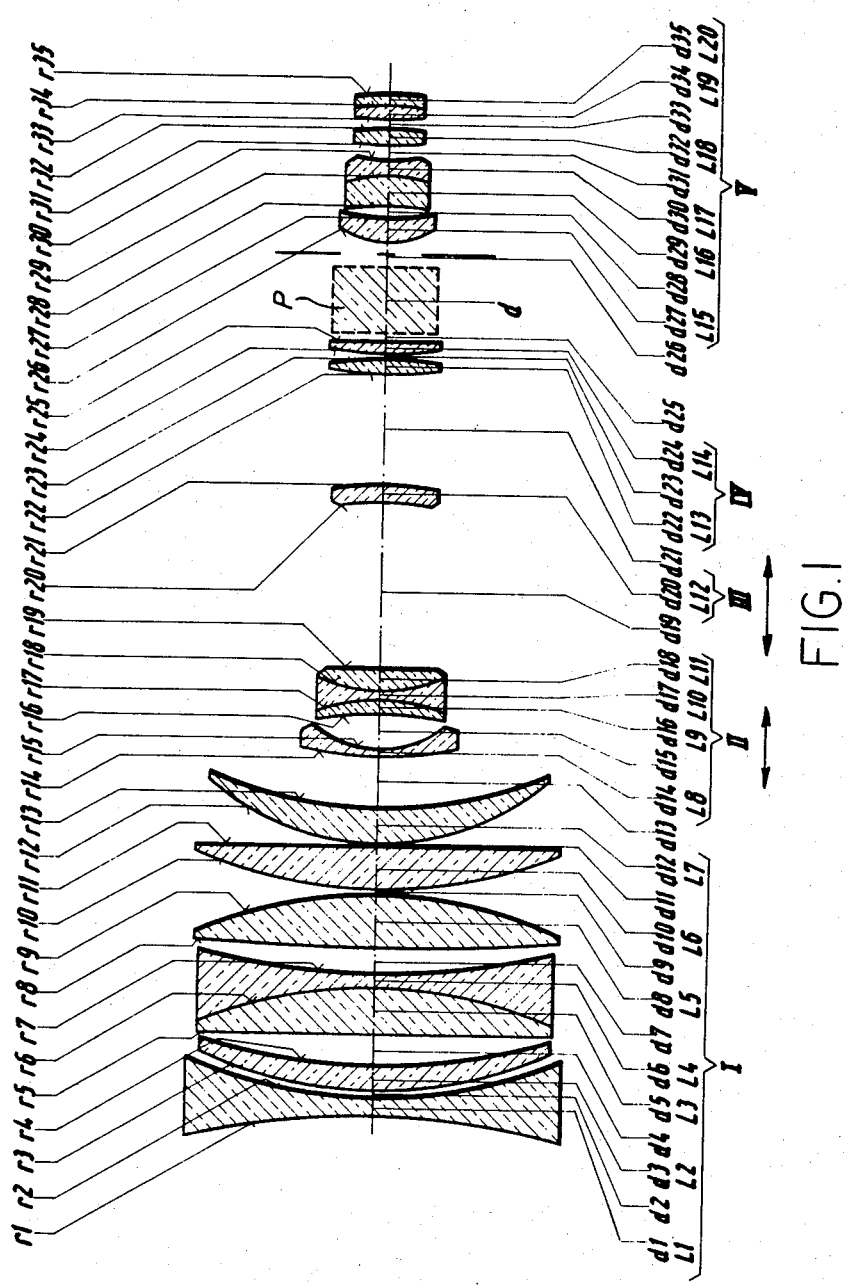

My present invention relates to a varifocal objective system of the general type disclosed in my prior U.S. Pat. No. 3,346,320 and in my copending applications Ser. No. 488,957, filed Sept. 21, 1965, now U.S. Pat. No. 3,442,-573, and Ser. No. 741,773, filed July 1, 1968.

This type of objective system includes a multilens basic objective of fixed focal length, preceded by a varifocal attachment which consists of a substantially fixed positive first component, an axially movable negative second component, an axially movable negative third component and a fixed positive fourth component; the term "substantially fixed," as applied to the first component, implies that the latter may be limitedly shiftable, in whole or in part, for focusing purposes as is well known per se.

In my aforementioned application Ser. No. 741,773, I have disclosed several objective systems of the character referred to, with a varifocal ratio upwards of 10:1 and a relative aperture of about 1:2, whose minimum focal length is shorter, by at least 10%, than the image diagonal; with a back-focal length ranging between three and four times the minimum overall focal length of the system, this corresponds to an image angle on the order of 45°. These systems have in common that their first component consists of one or two dispersive singlets followed by a collective singlet, a dispersive doublet and a group of three air-spaced positive singlets, the second component consisting of a negative singlet and a negative triplet; the third component is a single dispersive lens member, in the form of a doublet consisting of a biconcave lens of relatively high Abbé number and a biconvex lens of relatively low Abbé number, while the fourth component is composed of two air-spaced collective singlets. The individual focal length of the fourth group exceeds, by more than a third, that of the fourth component whereas the absolute value of the individual focal length of the third component exceeds, by at least 10%, that of the second component.

The general object of my present invention is to provide an improved system of the above-described character yielding a varifocal ratio greater than 13:1 with a relative aperture better than 1:2, and with limitation of the overall dimensions of the lens assembly to a minimum whereby the diameter of the front component is determined by the incident ray upon adjustment to maximum focal length. The invention further aims at affording optimum correction over the entire varifocal range and permitting closeup adjustment at very short distances without increase in the size of the front lenses and without reduction in quality.

I have found, in accordance with my present invention, that the aforestated objects can be realized by modifying the radii of curvature of the several radii of curvature and, in particular, by so dimensioning the radii of the confronting surfaces of the first two lense, i.e., a preferably biconcave negative front lens and a preferably meniscus-shaped collective second lens that the intervening air space takes the shape of a forwardly convex meniscus of positive refractivity, in contradistinction to the dispersive air space defined by the correspondng collective lens and an immediately preceding negative lens in the system of my application Ser. No. 741,773 wherein the radius of curvature of the first of these confronting surfaces had an absolute magnitude less than that of the radius of the other of these surfaces. With this modification it becomes possible to design the negative third component as a singlet, in lieu of the doublet employed in my earlier system, with resulting further simplification of the objective.

The above and other features of my invention will be described in greater detail with reference to the accompanying drawing in which:

FIG. 1 diagrammatically illustrates a representative embodiment; and

Figure 2:
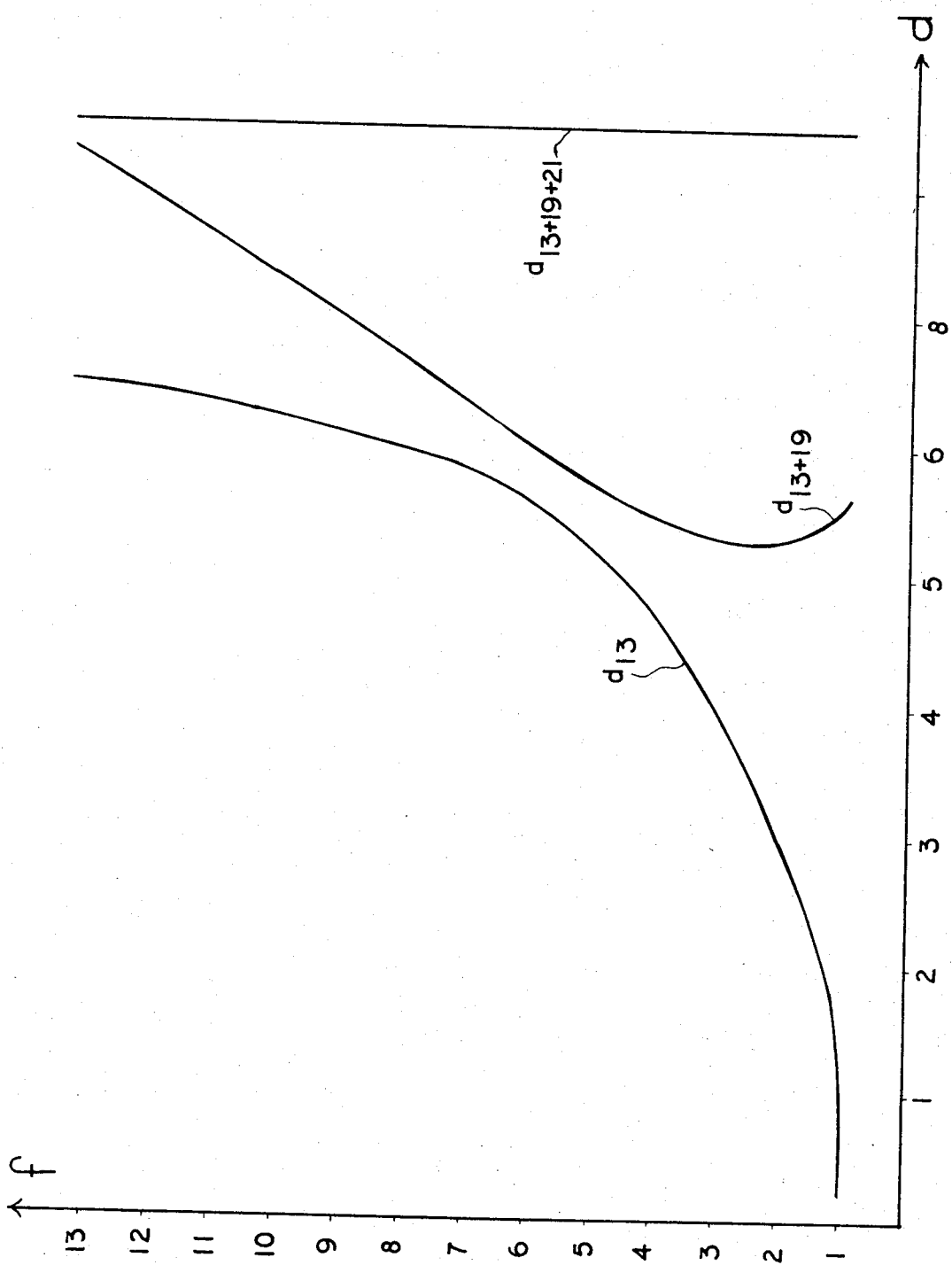

FIG. 2 is a graph representing the changes in the positions of the movable components of the front attachment forming part of the system of FIG. 1.

In FIG. 1 I have illustrated an optical system according to my invention which comprises a front attachment, consisting of four components, I, II, III and IV, and a basic multilens objective V, the two lens groups being separated by a diaphragm space accommodating a reflex prism P with planar front and rear surfaces.

Component I, assumed to be limitedly shiftable along the objective axis O for focusing purposes, consists of seven lenses L1 to L7. Lens L1 is a dispersive singlet with radii $r1$, $r2$ and thickness $d1$; it is separated by an air space $d2$ from lens L2, a collective singlet with radii $r3$, $r4$ and thickness $d3$ which in turn is followed after an air space $d4$ by a dispersive doublet consisting of positive lens L3 (radii $r5$, $r6$ and thickness $d5$) and negative lens L4 (radii $r6$, $r7$ and thickness $d6$). Another air space $d7$ separates this doublet from a group of three closely spaced positive singlets, i.e., lens L5 with radii $r8$, $r9$ and thickness $d8$, lens L6 with radii $r10$, $r11$ and thickness $d10$, and lens L7 with radii $r12$, $r13$ and thickness $d12$; the intervening air spaces have been designated $d9$ and $d11$.

Component II is of negative power and is axially shiftable, being separated by a variable air space $d13$ from component I. It consists of a negative singlet L8 (radii $r14$, $r15$ and thickness $d14$) followed, after an air space $d15$, by a negative triplet composed of a positive meniscus L9 (radii $r16$, $r17$ and thickness $d16$), a biconcave lens L10 (radii $r17$, $r18$ and thickness $d17$) and another positive meniscus L11 (radii $r18$, $r19$ and thickness $d18$).

A further variable air space $d19$ separates component II from component III which is also of dispersive character and shiftable along the axis; it is a meniscus-shaped single lens L12 of radii $r20$, $r21$ and thickness $d20$.

The axially fixed fourth component IV, of positive refractivity, follows after another variable air space $d21$ and consists of a pair of closely spaced positive lenses L13 (radii $r22$, $r23$ and thickness $d22$) and L15 (radii $r24$, $r25$ and thickness $d24$), their separation being designated $d23$.

The two air spaces on either side of prism P have been indicated at $a25$ and $d26$, the thickness of the prism being designated $dp$.

The basic objective V consists of a positive first lens L15 (radii $r26$, $r27$ and thickness $d27$) separated by an air space $d28$ from a negative doublet composed of a positive second lens L16 (radii $r28$, $r29$ and thickness $d29$) and a biconcave third lens L17 (radii $r29$, $r30$ and thickness $d30$), this doublet in turn being followed after an air space $d31$ by a positive fourth lens L18 (radii $r31$, $r32$ and thickness $d32$) which is separated by an air space $d33$ from a positive doublet composed of a biconvex fifth lens L19 (radii $r33$, $r34$ and thickness $d34$) and a sixth lens in the form of a negative meniscus L20 (radii $r34$, $r35$ and thickness $d35$).

The aforestated objects of large varifocal range, high aperture ratio, relatively large back-focal length and favorable relationship between minimum focal length and image diagonal are best achieved, pursuant to a more specific aspect of my invention, by adhering to the following design specifications for the radii of curvature of the various lenses as related to the individual focal lengths of the components of which they form part. In the varifocal attachment of FIG. 1, the radii $r1$ to $r13$ of the six-member front component I should be related to the individual focal length $f_I$ by the inequalities listed below:

$5 f_I > -r1 > f_I$
$2 f_I > r2 > 0.5 f_I$
$2 f_I > r3 > 0.5 f_I$
$5 f_I > r4 > f_I$
$|r5| > 5 f_I$
$1.5 f_I > -r6 > 0.8 f_I$
$3 f_I > r7 > f_I$
$10 f_I > r8 > 2 f_I$
$3 f_I > -r9 > f_I$
$3 f_I > r10 > f_I$
$|r11| > 8 f_I$
$f_I > r12 > 0.5 f_I$
$2 f_I > r13 > f_I$

The radii $r14$ to $r19$ of the second component II should be related to the individual focal length $f_{II}$ by the following inequalities:

$5 |f_{II}| > r14 > 2 |f_{II}|$
$2 |f_{II}| > r15 > 0.5 |f_{II}|$
$3 |f_{II}| > -r16 > |f_{II}|$
$2 |f_{II}| > -r17 > |f_{II}|$
$2 |f_{II}| > r18 > |f_{II}|$
$5 |f_{II}| > r19 > 2 |f_{II}|$

As to the third component III, the following relationships apply to the radii $r20$, and the individual focal length $f_{III}$ thereof:

$|f_{III}| > -r20 > 0.3 |f_{III}|$
$3 |f_{III}| > -r21 > |f_{III}|$

For the fourth component IV with its radii $r22$ to $r25$, and its individual focal length $f_{IV}$ the inequalities are:

$10 f_{IV} > |r22| > 2 f_{IV}$
$1.5 f_{IV} > -r23 > 0.6 f_{IV}$
$2 f_{IV} > r24 > 0.7 f_{IV}$
$|r25| > 3 f_{IV}$

The radii $r26$ to $r35$ of the four lens members of the basic objective V should bear the following relationship with its individual focal length $f_V$:

$0.8 f_V > r26 > 0.3 f_V$
$2 f_V > r27 > f_V$
$1.2 f_V > -r28 > 0.5 f_V$
$0.5 f_V > -r29 > 0.2 f_V$
$0.7 f_V > r30 > 0.3 f_V$
$2 f_V > r31 > 0.5 f_V$
$2 f_V > -r32 > f_V$
$0.8 f_V > r33 > 0.4 f_V$
$0.7 f_V > -r34 > 0.3 f_V$
$2 f_V > -r35 > 0.8 f_V$

The negative front lens of the first component is designed to increase the back-focal length of that group. The distribution of the refractive powers specified above has the purpose of shifting the entrance pupil throughout the varifocal range so far ahead that the diameters of the members of these components, especially of the front lens, may be relatively small. In addition, the relationships set forth afford good correction of all aberrations throughout the operative range.

I shall now list specific numerical values for the radii of curvature and the thicknesses and separations of a representative embodiment of the varifocal attachment in its wide-angle position and of the basic objective illustrated in FIG. 1, these parameters being based on a numerical value of unity for the minimum focal length $f_{min}$ of the system; the Table I listing these parameters also sets forth the values of the corresponding refractive indices $n_d$, the Abbé numbers $v$ and the surface powers $\Delta n/r$. It is to be understood that the tabulated values may vary within tolerances of ±20% for the radii as well as the thicknesses and separations, the tolerances for $n_d$ being ±0.02 and those for the Abbé numbers being ±5. In view of these tolerances, some of the decimals listed in the table for the sake of completeness are considered insignificant both for the preferred systems and for the range of tolerances based thereon.

Table I, below, relates to a system having a varifocal ratio of about 13.3:1, a back-focal length of 2.37 linear units ($f_{min}=1$) and a relative aperture of 1:1.8.

TABLE I

| Lenses | Radii | Thicknesses and separations | $n_d$ | $v$ | Surface power, $\Delta n/r$ |
|---|---|---|---|---|---|
| I L1 | r1= −19.190 | d1= 0.411 | 1.62041 | 60.3 | −0.032330 |
| | r2= +12.233 | d2=0.205 | | air space | −0.050716 |
| L2 | r3= +11.041 | d3=0.616 | 1.69895 | 30.1 | +0.063305 |
| | r4= +17.302 | d4= 0.692 | | air space | −0.040397 |
| L3 | r5= +94.523 | d5= 1.206 | 1.71300 | 53.8 | +0.007543 |
| L4 | r6= −12.003 | d6= 0.360 | 1.76180 | 26.9 | −0.004066 |
| | r7= +20.559 | d7= 0.479 | | air space | −0.037054 |
| L5 | r8= +34.478 | d8= 1.438 | 1.64050 | 60.1 | +0.018577 |
| | r9= −10.863 | d9= 0.010 | | air space | +0.058962 |
| L6 | r10= +11.521 | d10= 1.696 | 1.64050 | 60.1 | +0.055594 |
| | r11= +94.523 | d11= 0.010 | | air space | −0.006776 |
| L7 | r12= +6.378 | d12= 0.890 | 1.64050 | 60.1 | +0.100423 |
| | r13= +10.589 | d13= 0.137 | | air space (variable) | −0.060487 |
| II L8 | r14= +6.474 | d14= 0.195 | 1.69100 | 54.7 | +0.106735 |
| | r15= +2.292 | d15= 0.918 | | air space | −0.301483 |
| | r16= −7.537 | d16= 0.329 | 1.80518 | 25.4 | −0.106830 |
| L9 | r17= −3.697 | d17= 0.195 | 1.71300 | 53.8 | +0.024934 |
| L10 | r18= +3.415 | d18= 0.438 | 1.80518 | 25.4 | +0.026993 |
| L11 | r19= +11.113 | d19= 5.497 | | air space (variable) | −0.072454 |
| III L12 | r20= −3.048 | d20= 0.274 | 1.62280 | 56.9 | −0.204331 |
| | r21= −12.173 | d21= 2.837 | | air space (variable) | +0.051162 |
| IV L13 | r22= +13.014 | d22= 0.370 | 1.52542 | 64.7 | +0.040373 |
| | r23= −6.086 | d23= 0.010 | | air space | +0.086333 |
| L14 | r24= +4.803 | d24= 0.292 | 1.52542 | 64.7 | +0.109394 |
| | r25= +18.820 | d25= 0.274 | | air space | −0.027918 |
| Prism | plane | dP= 1.644 | 1.51680 | 64.2 | ±0 |
| | plane | d26= 0.616 | | air space | ±0 |
| V L15 | r26= +2.073 | d27= 0.558 | 1.48749 | 70.4 | +0.235162 |
| | r27= +6.865 | d28= 0.219 | | air space | −0.071011 |
| L16 | r28= −5.421 | d29= 0.884 | 1.76180 | 27.0 | −0.140528 |
| L17 | r29= −1.658 | d30= 0.190 | 1.67270 | 32.2 | +0.053739 |
| | r30= +2.260 | d31= 0.419 | | air space | −0.297655 |
| L18 | r31= +4.888 | d32= 0.437 | 1.48749 | 70.4 | +0.099732 |
| | r32= −5.536 | d33= 0.051 | | air space | +0.088058 |
| L19 | r33= +2.364 | d34= 0.575 | 1.50137 | 56.4 | +0.212085 |
| L20 | r34= −2.170 | d35= 0.205 | 1.80518 | 25.4 | −0.140005 |
| | r35= −5.525 | | | | +0.145734 |

The individual focal lengths of the components I–V are as follows:

$$f_I = +9.0388$$
$$f_{II} = -2.8886$$
$$f_{III} = -6.5776$$
$$f_{IV} = +4.7970$$
$$f_V = +4.6766$$

The air spaces $d13$, $d19$ and $d21$, given in the table for the initial position $f=f_{min}$, vary in the manner illustrated in FIG. 2 as the overall focal length $f$ changes from its minimum value $f_{min}$ to its maximum value $f_{max}$. Particular magnitudes for these variable air spaces in six selected positions are listed below:

| | Variable air spaces | | |
|---|---|---|---|
| $f$ | d13 | d19 | d21 |
| 1.0 | 0.137 | 5.497 | 2.837 |
| 2.1 | 3.013 | 2.262 | 3.196 |
| 4.3 | 4.907 | 0.598 | 2.966 |
| 7.6 | 5.912 | 0.597 | 1.962 |
| 10.3 | 6.269 | 1.114 | 1.088 |
| 13.3 | 6.475 | 1.781 | 0.215 |

Although the embodiment described and illustrated provides a high degree of correction, particularly for chromatic aberrations, further refinements are possible by substituting compound lenses for some of the singlets and/or by separating the illustrated doublets and triplets into closely spaced individual lenses with confronting surfaces having slightly differing radii of curvature. Such modifications, readily apparent to persons skilled in the art, are intended to be embraced within the spirit and scope of my invention.

I claim:

1. A varifocal objective system comprising a basic multilens objective and a varifocal front attachment for said objective, said attachment consisting of a substantially fixed positive first component, an axially movable negative second component, an axially movable negative third component and a fixed positive fourth component; said first component consisting of a dispersive front lens, a collective singlet following said front lens, a dispersive doublet following said collective singlet, and a group of three air-spaced positive singlets following said doublet; said second component consisting of a negative singlet and a negative triplet; said third component consisting of a dispersive singlet; said fourth component consisting of two air-spaced collective singlets; the absolute values of the individual focal lengths of said first and third components substantially exceeding those of said fourth and second components, respectively; said front lens and said collective singlet together defining a forwardly convex meniscus-shaped air space of positive refractivity; said basic objective consisting of a positive first lens, a dispersive doublet composed of a positive second lens and a negative third lens, a positive fourth lens and a collective doublet composed of a positive fifth lens and a negative sixth lens; the numerical values of the radii $r26$ to $r35$ of said first lens L15, said second lens L16, said third lens L17, said fourth lens L18, said fifth lens L19 and said sixth lens L20, and of the axial thicknesses and separations $d26$ to $d34$ thereof, based upon a numerical value of 1 for a minimum overall focal length of the system, the refractive indices $n_d$ of said lenses and their Abbé

| | | | | |
|---|---|---|---|---|
| L15 | r26=+2.1 | d27=0.6 | 1.49 | 70 |
| | r27=+6.9 | d28=0.2 | air space | |
| L16 | r28=-5.4 | d29=0.9 | 1.76 | 27 |
| L17 | r29=-1.7 | d30=0.2 | 1.67 | 32 |
| | r30=+2.3 | d31=0.4 | air space | |
| L18 | r31=+4.9 | d32=0.4 | 1.49 | 70 |
| | r32=-5.5 | d33=0.1 | air space | |
| L19 | r33=+2.4 | d34=0.6 | 1.50 | 56 |
| L20 | r34=-2.2 | d35=0.2 | 1.81 | 25 |
| | r35=-5.5 | | | |

2. A system as defined in claim 1 wherein said collective singlet, following said front lens L1, is a second lens L2, said dispersive doublet is composed of a positive third lens L3 and a negative fourth lens L4, said three positive singlets are a fifth lens L5, a sixth lens L6 and a seventh lens L7, said negative singlet is an eighth lens L8, said negative triplet is composed of a positive ninth lens L9, a biconcave tenth lens L10 and a positive eleventh lens L11, said dispersive lens member is a meniscus-shaped twelfth lens L12, and said collective singlets are a thirteenth lens L13 and a fourteenth lens L14, the numerical values of the radii $r1$ to $r25$ of said lenses L1 to L14 and of the axial thicknesses and separations $d1$ to $d24$ thereof, based upon a numerical value of 1 for a minimum overall focal length of the system, the refractive indices $n_d$ of said lenses and their Abbé numbers $v$ being substantially as given in the following table:

| | | | | |
|---|---|---|---|---|
| L1 | r1=-19.2 | d1=0.4 | 1.62 | 60 |
| | r2=+12.2 | d2=0.2 | air space | |
| L2 | r3=+11.0 | d3=0.6 | 1.70 | 30 |
| | r4=+17.3 | d4=0.7 | air space | |
| L3 | r5=+94.5 | d5=1.2 | 1.71 | 54 |
| L4 | r6=-12.0 | d6=0.4 | 1.76 | 27 |
| | r7=+20.6 | d7=0.5 | air space | |
| L5 | r8=+34.5 | d8=1.4 | 1.64 | 60 |
| | r9=-10.9 | d9=0.01 | air space | |
| L6 | r10=+11.5 | d10=1.1 | 1.64 | 60 |
| | r11=+94.5 | d11=0.01 | air space | |
| L7 | r12=+6.4 | d12=0.9 | 1.64 | 60 |
| | r13=+10.6 | d13=0.1 | air space [1] | |
| L8 | r14=+6.5 | d14=0.2 | 1.69 | 55 |
| | r15=+2.3 | d15=0.9 | air space | |
| L9 | r16=-7.5 | d16=0.3 | 1.81 | 25 |
| L10 | r17=-3.7 | d17=0.2 | 1.71 | 54 |
| L11 | r18=+3.4 | d18=0.4 | 1.81 | 25 |
| | r19=+11.1 | d19=5.5 | air space [1] | |
| L12 | r20=-3.0 | d20=0.3 | 1.62 | 57 |
| | r21=-12.2 | d21=2.8 | air space [1] | |
| L13 | r22=+13.0 | d22=0.4 | 1.53 | 65 |
| | r23=-6.1 | d23=0.01 | air space | |
| L14 | r24=+4.8 | d24=0.3 | 1.53 | 65 |
| | r25=+18.8 | | | |

[1] Variable.

References Cited

FOREIGN PATENTS

| | | | |
|---|---|---|---|
| 082,637 | 2/1964 | France | 350—184 |
| | Addition to No. 1,333,932 | | |
| 411,383 | 11/1966 | Switzerland | 350—184 |
| 1,092,677 | 11/1967 | Great Britain | 350—184 |

DAVID SCHONBERG, Primary Examiner

P. A. SACHER, Assistant Examiner

U.S. Cl. X.R.

350—204